US012667048B2

(12) United States Patent
Huang et al.

(10) Patent No.: US 12,667,048 B2
(45) Date of Patent: Jun. 30, 2026

(54) LIFT DETECTION MECHANISM OF MOWING ROBOT

(71) Applicant: DURQ MACHINERY CORP., Taichung City (TW)

(72) Inventors: Yu-Chia Huang, Taichung City (TW); Fu-Peng Chou, Taichung City (TW)

(73) Assignee: DURQ MACHINERY CORP., Taichung City (TW)

( * ) Notice: Subject to any disclaimer, the term of this patent is extended or adjusted under 35 U.S.C. 154(b) by 287 days.

(21) Appl. No.: 18/654,334

(22) Filed: May 3, 2024

(65) Prior Publication Data

US 2024/0373784 A1 Nov. 14, 2024

(30) Foreign Application Priority Data

May 12, 2023 (DE) .......................... 202023102576.5

(51) Int. Cl.
| | |
|---|---|
| *A01D 34/00* | (2006.01) |
| *A01D 34/82* | (2006.01) |
| *A01D 75/18* | (2006.01) |
| *G05D 1/02* | (2020.01) |
| *A01D 101/00* | (2006.01) |

(52) U.S. Cl.
CPC ......... *A01D 34/828* (2013.01); *A01D 34/008* (2013.01); *A01D 2101/00* (2013.01)

(58) Field of Classification Search
CPC .... A01D 34/828; A01D 34/008; A01D 34/81;
A01D 34/82; A01D 67/005; A01D 75/18;
A01D 75/20; G05D 1/0265; G05D
1/0225; G05D 1/0227
See application file for complete search history.

(56) References Cited

U.S. PATENT DOCUMENTS

| | | | |
|---|---|---|---|
| 11,540,440 B2 * | 1/2023 | Olsson | ................ A01D 67/005 |
| 2023/0263092 A1 * | 8/2023 | Lee | ...................... A01D 34/008 |
| | | | 56/255 |

FOREIGN PATENT DOCUMENTS

CN 206611779 U 11/2017

* cited by examiner

*Primary Examiner* — Joseph M Rocca
*Assistant Examiner* — Robert E Pezzuto
(74) *Attorney, Agent, or Firm* — MUNCY, GEISSLER, OLDS & LOWE, P.C.

(57) ABSTRACT

A lift detection mechanism of a mowing robot includes a wheel set, a movable member, a transmitter, and a receiver. The wheel set has an axle rotatably and movably penetrated into a fixed seat, a wheel connected to the axle and located outside of the fixed seat, and a fixing member disposed to the axle and located in the fixed seat. The movable member is disposed to the axle and located in the fixed seat. One of the transmitter and the receiver is disposed to the movable member, and the other of the transmitter and the receiver is disposed to the fixed seat. As such, when the mowing robot is lifted by a user, the movable member is driven by an elastic member to move downwards until the transmitter and the receiver are staggered. As such, blades are controlled to stop working for preventing the user from being cut.

5 Claims, 6 Drawing Sheets

LIFT DETECTION MECHANISM OF MOWING ROBOT

BACKGROUND OF THE INVENTION

1. Field of the Invention

The present invention relates to mowing machines and more particularly, to a lift detection mechanism of a mowing robot.

2. Description of the Related Art

Traditional lawn care work is carried out by manpower with hand-held tools. With the popularization of automation, a mowing robot that walks on the lawn in a wheeled type to mow the lawn has been developed. The mowing robot can be cooperated with a user to perform a mowing operation for greatly reducing the user's burden. In addition, in order to ensure the safety of use, the traditional mowing robot is equipped with a lifting detection mechanism. When the user lifts the mowing robot in order to move or repair it, and forgets to turn it off, the lifting detection mechanism is activated to stop the blades in operation for avoiding the user to being cut by the blades.

The utility model patent CN206611779U discloses a lifting detection mechanism and a mowing robot using the same. The lifting detection mechanism includes a fixing member, a vertical axle, and a displacement sensor. The vertical axle is penetrated through the fixing member and connected to a walking wheel through its lower end. The displacement sensor has a sensing end disposed to the fixing member and a triggering end disposed to the vertical axle and corresponding to the sensing end. When a user lifts the mowing robot, the vertical axle is lowered due to the weight of the walking wheel, such that the triggering end is lowered along with the vertical axle so as not to correspond to the sensing end. At this time, the blades of the mowing robot are controlled by a signal generated by the sensing end to stop working for preventing the user from being cut by the blades in operation. However, in the aforesaid prior art, the connection between the vertical axle and the fixing member is easily blocked by grassy soil or grass clippings, so that the vertical axle cannot be lowered reliably, and the trigger end and the sensing end cannot be staggered, causing functional failure of the lifting detection mechanism. There will be safety hazards in use.

SUMMARY OF THE INVENTION

It is a primary objective of the present invention to provide a lift detection mechanism of a mowing robot, which prevents functional failure caused by blockage of grassy soil or grass clippings.

To attain the above objective, the lift detection mechanism of the present invention comprises a fixed seat, a wheel seat, a location sensing unit, and an elastic member. The fixed seat has an accommodation chamber therein. The wheel set includes an axle, a wheel, and a fixing member. The axle is penetrated into the fixed seat and rotated relative to the fixed seat and moved axially along its axial direction. The wheel is rotatably connected to the axle and located outside of the fixed seat. The fixing member is fixed to the axle and located in the accommodation chamber so as to be rotated together with the axle and moved axially together with the axle between a topmost position and a bottommost position. The location sensing unit includes a movable member, a transmitter, and a receiver. The movable member is sleeved on the axle and the wheel and located in the accommodation chamber. The movable member is moved axially together with the fixing member and the fixing member is rotatable relative to the movable member. One of the transmitter and the receiver is disposed to the fixed seat, and the other of the transmitter and the receiver is disposed to the moveable member. The elastic member provides an elastic force to move the movable member towards the bottommost position. When the fixing member is located at the topmost position, the transmitter and the receiver correspond to each other, and when the fixing member is located at the bottommost position, the transmitter and the receiver are staggered with each other.

It can be seen from the above that when the mowing robot is not lifted to allow the wheel to touch the ground, the fixing member is kept in the topmost position where the transmitter and the receiver correspond to each other. At this time, a blade of the mowing robot is controlled to operate. When the mowing robot is lifted to raise the wheel off the ground, the axle is lowered due to the weight of the wheel, and the movable member is driven by the elastic force of the elastic member to move together with the axle towards the bottommost position for ensuring the transmitter and the receiver to be staggered. At this time, the blade of the mowing robot is controlled to stop working. As such, when a user lifts up the mowing robot and forgets to turn it off, the lift detection mechanism can actually be activated for preventing the user from being cut by the blade in operation.

Preferably, the fixed seat includes a top cover, a bottom cover connected to the top cover, and the accommodation chamber located between the top cover and the bottom cover. The movable member has a top surface, a bottom surface opposite to the top surface, an axle hole passing through the top surface and the bottom surface, and a top recess located at the top surface. The axle is penetrated into the axle hole. The elastic member is a coil spring and provided with one end abutted against the top cover and the other end received in the top recess and abutted against the movable member. In this way, when the mowing robot is lifted, the elastic member provides the elastic force to move the movable member towards the bottommost position for ensuring the transmitter and the receiver to be staggered, thereby ensuring the security mechanism to be activated.

Preferably, the movable member has a bottom recess located at the bottom surface. The fixing member is received in the bottom recess and abutted against the moveable member. In this way, the movable member and the fixing member can be moved axially together.

Preferably, the top cover has a limiting concavity, and one side of the movable member has a convexity inserted in the limiting concavity. In this way, the movable member is prevented from rotating together with the fixing member around the axial direction of the axle.

Preferably, the receiver is disposed to a position of the top cover corresponding to the limiting concavity, and the transmitter is disposed to the convexity of the movable member. In this way, when the mowing robot is not lifted, the transmitter and the receiver can be positioned in a correct position and correspond to each other.

Other advantages and features of the present invention will be fully understood by reference to the following specification in conjunction with the accompanying drawings, in which like reference signs denote like components of structure.

DETAILED DESCRIPTION OF THE INVENTION

Figure 1:
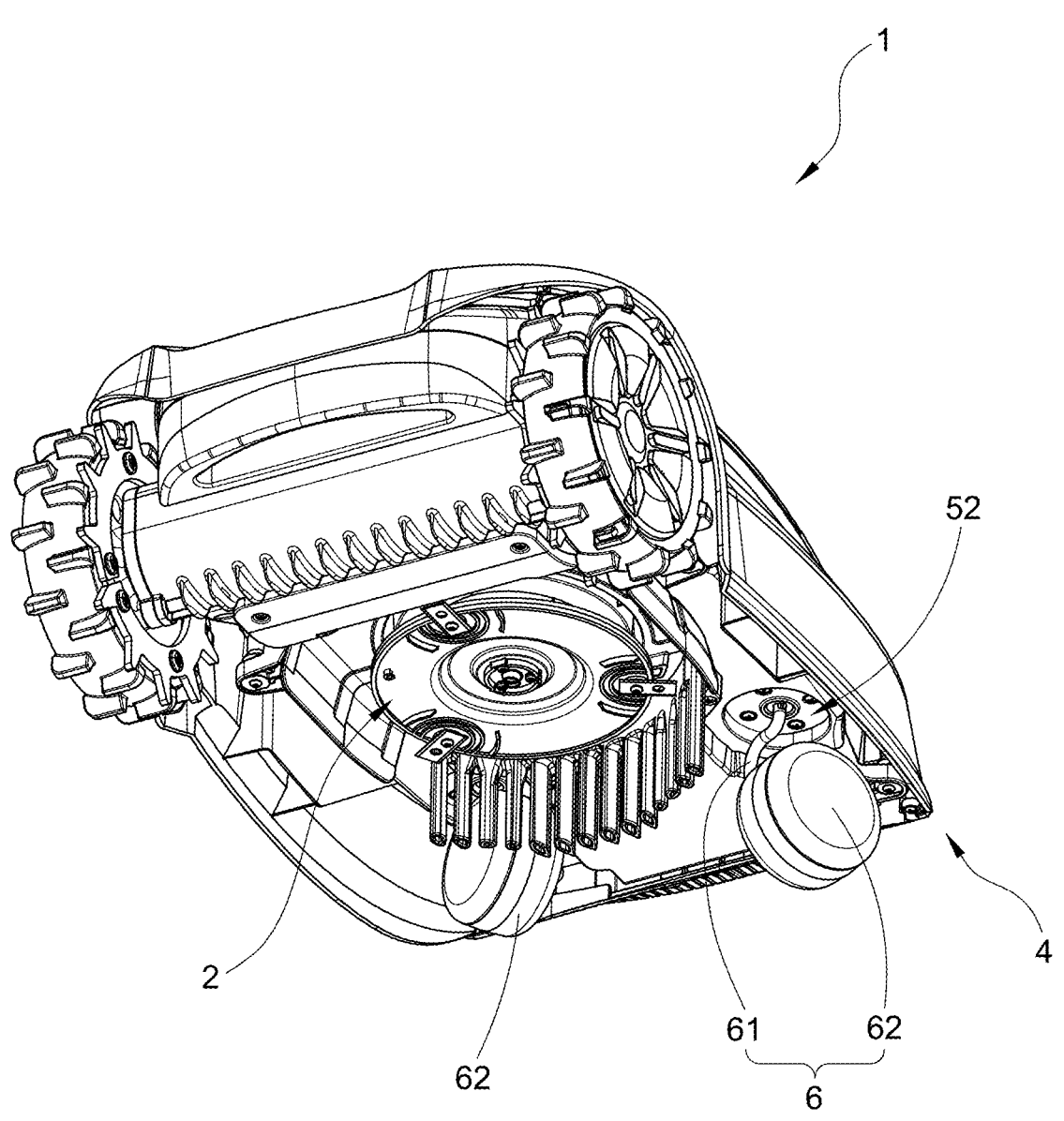
FIG. 1 is a bottom perspective view of a mowing robot used with a lifted detection mechanism of the present invention, showing that the wheel is located outsides of the fixed seat.
Figure 2:
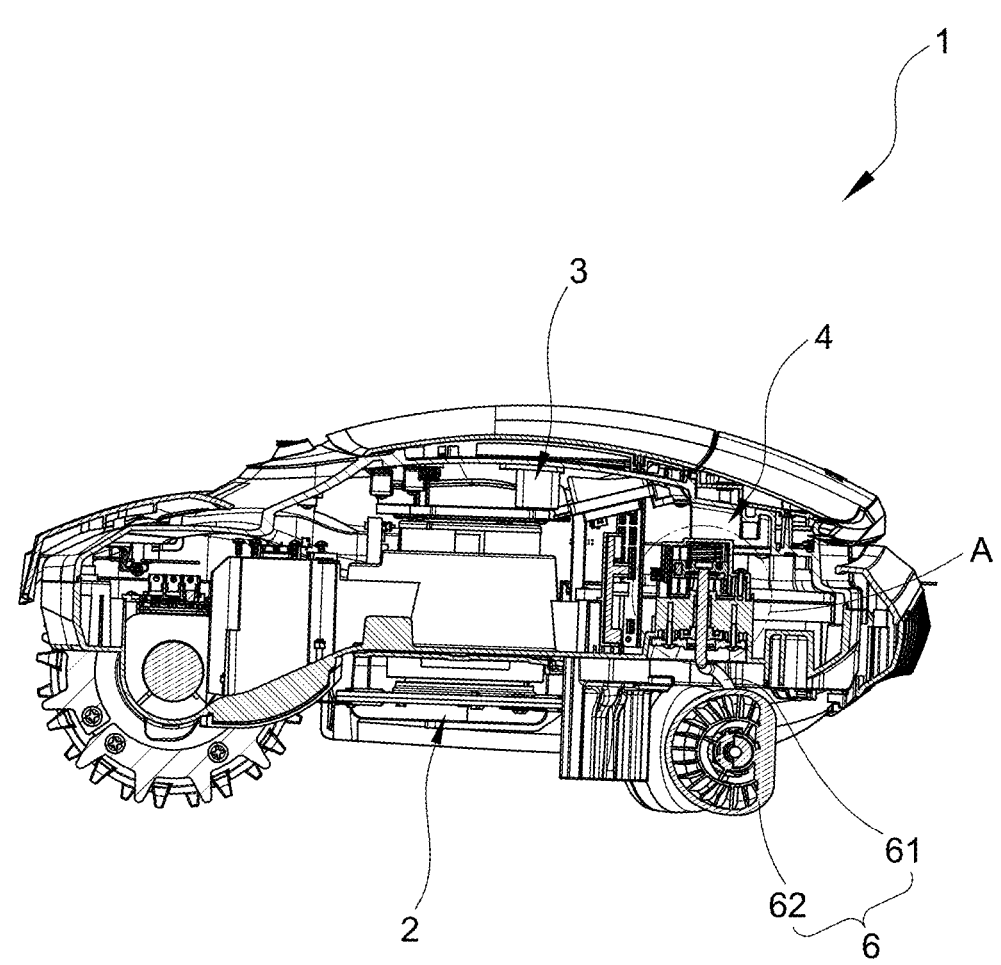
FIG. 2 is a lateral sectional view of the mowing robot used with a lifted detection mechanism of the present invention, showing that the arrangement position of the lifted detection mechanism.
Figure 6:
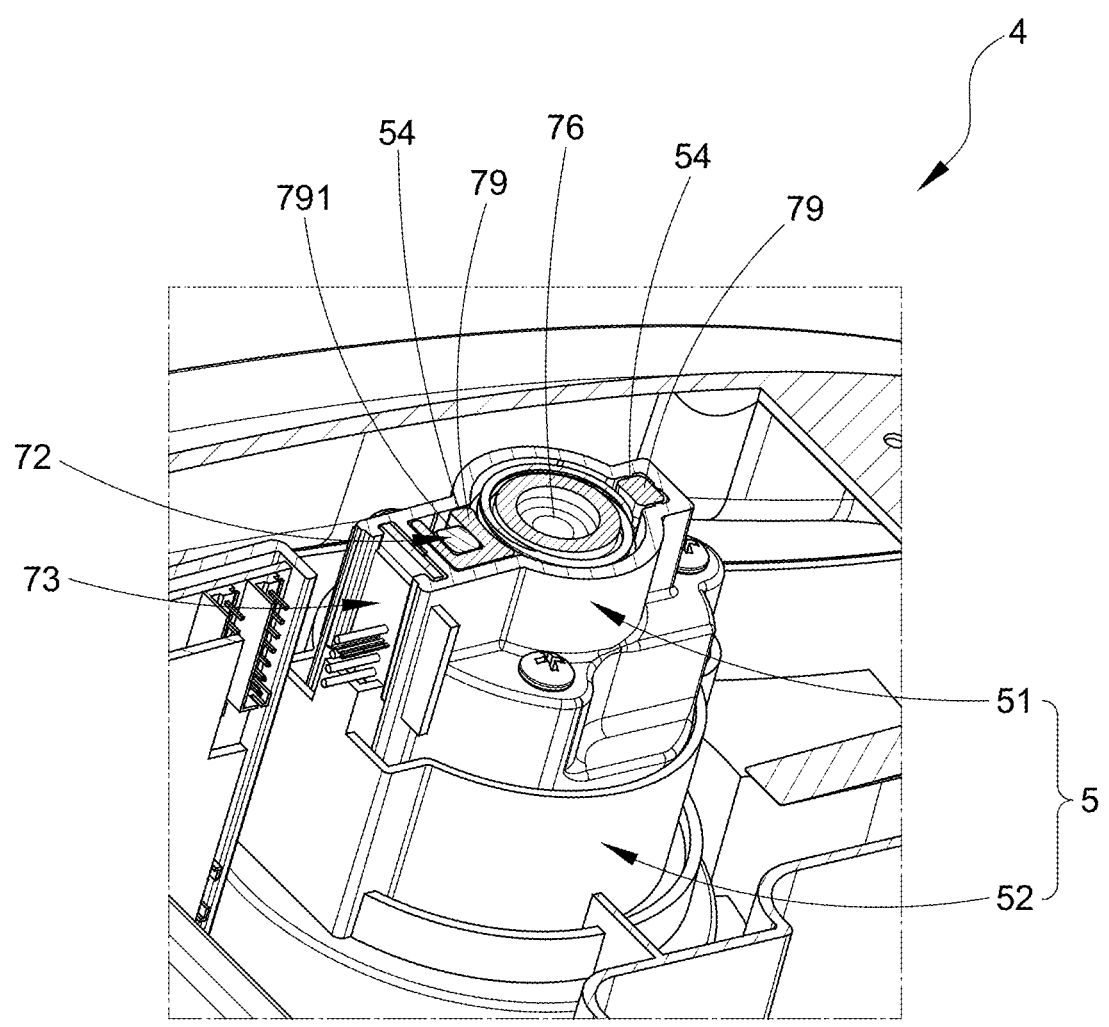
FIG. 6 is a perspective transverse sectional view of a portion of the lifted detection mechanism of the present invention.

Referring to FIGS. 1 and 2, a mowing robot 1 shown in FIG. 1 comprises a blade unit 2 and a control system 3 controlling the blade unit 2 to operate (see FIG. 2). As shown in FIG. 2, a lift detection mechanism 4 of the present invention is adjacent to the blade unit 2 and comprises a fixed seat 5 (see FIG. 6), a wheel set 6, a location sensing unit 7 (see FIG. 3), and an elastic member 8.

Figure 3:
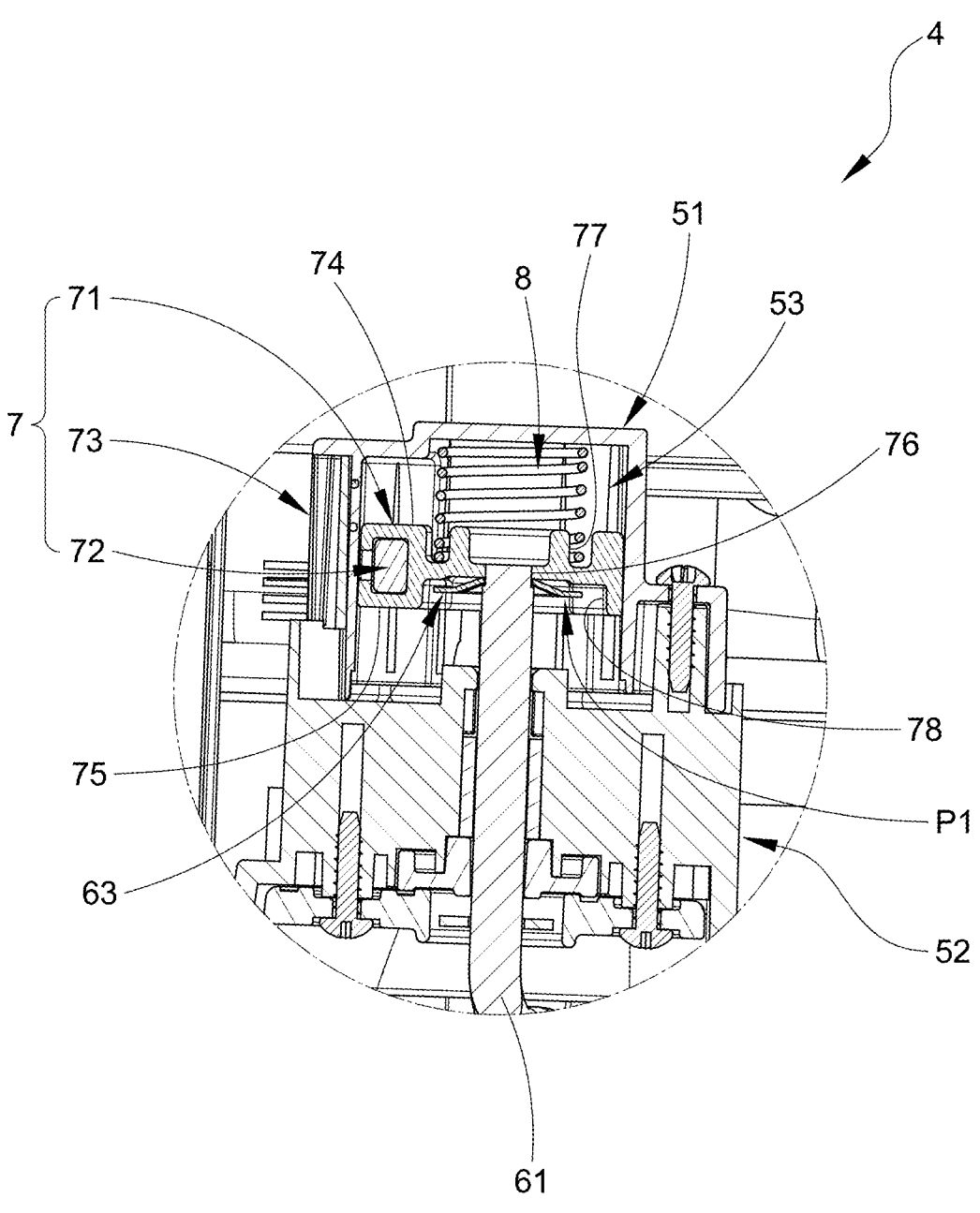
FIG. 3 is an enlarged view of a circle indicated by A of FIG. 2, showing that the fixing member is located at the topmost position.

As shown in FIG. 3, the fixed seat 5 includes a top cover 51 and a bottom cover 52 connected to the top cover 51. Two sides of the top cover 51 have two limiting concavities 54 arranged in a symmetrical manner (see FIG. 6). In addition, an accommodation chamber 53 is provided in the fixed seat 5 and located between the top cover 51 and the bottom cover 52.

The wheel set 6 includes an axle 61, a wheel 62 (see FIG. 1), and a fixing member 63. The axle 61 is penetrated into the bottom cover 52 and rotated relative to the fixed seat 5 and moved axially along its axial direction. The wheel 62 is rotatably connected to the axle 61 and located outside of the fixed seat 5. The fixing member 63 is fixed to the axle 61 and located in the accommodation chamber 53 so as to be rotated together with the axle 61 and moved axially together with the axle 61 between a topmost position P1 (see FIG. 3) and a bottommost position P2 (see FIG. 4).

Figure 4:
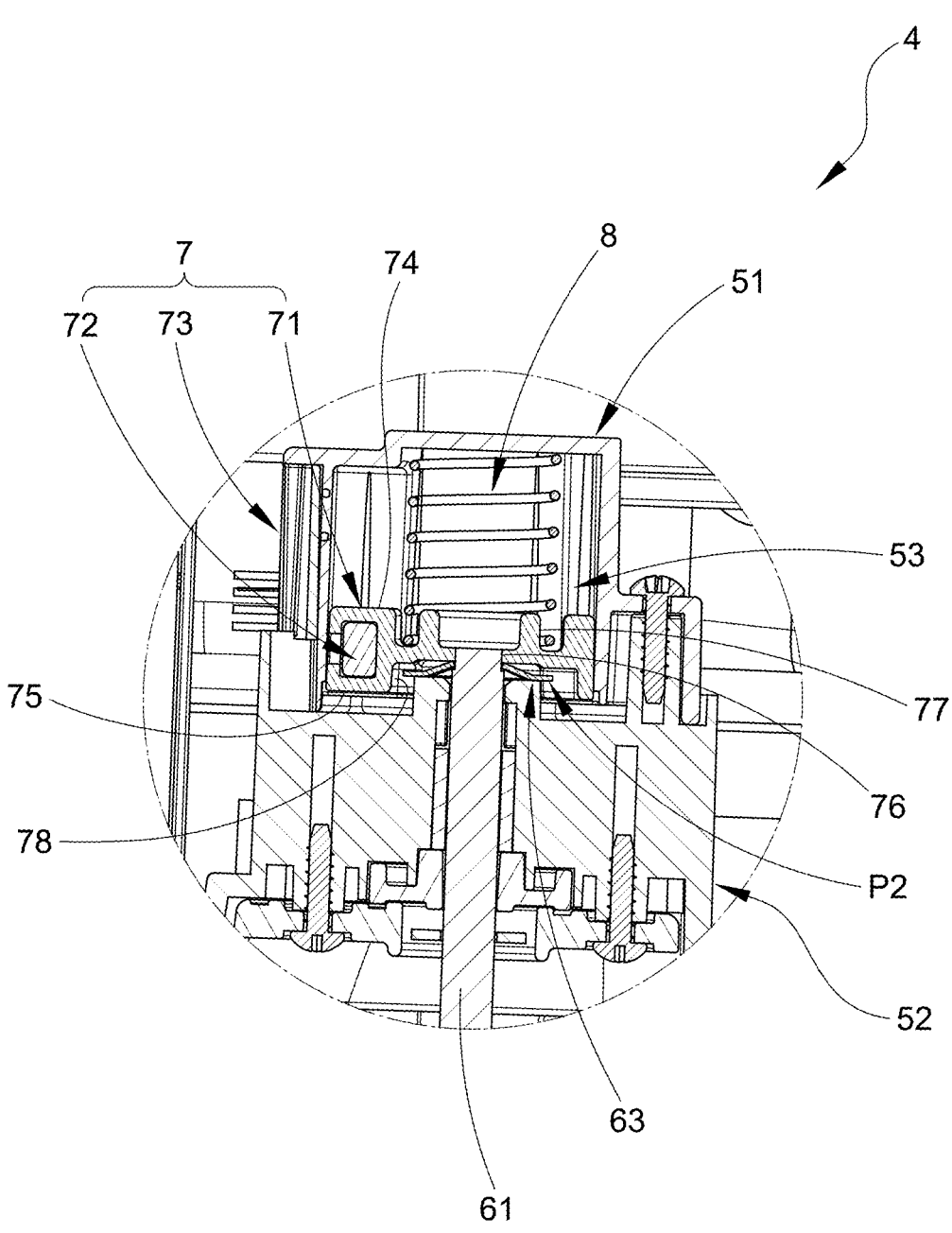
FIG. 4 is similar to FIG. 3, showing that the fixing member is located at the bottommost position.
Figure 5:
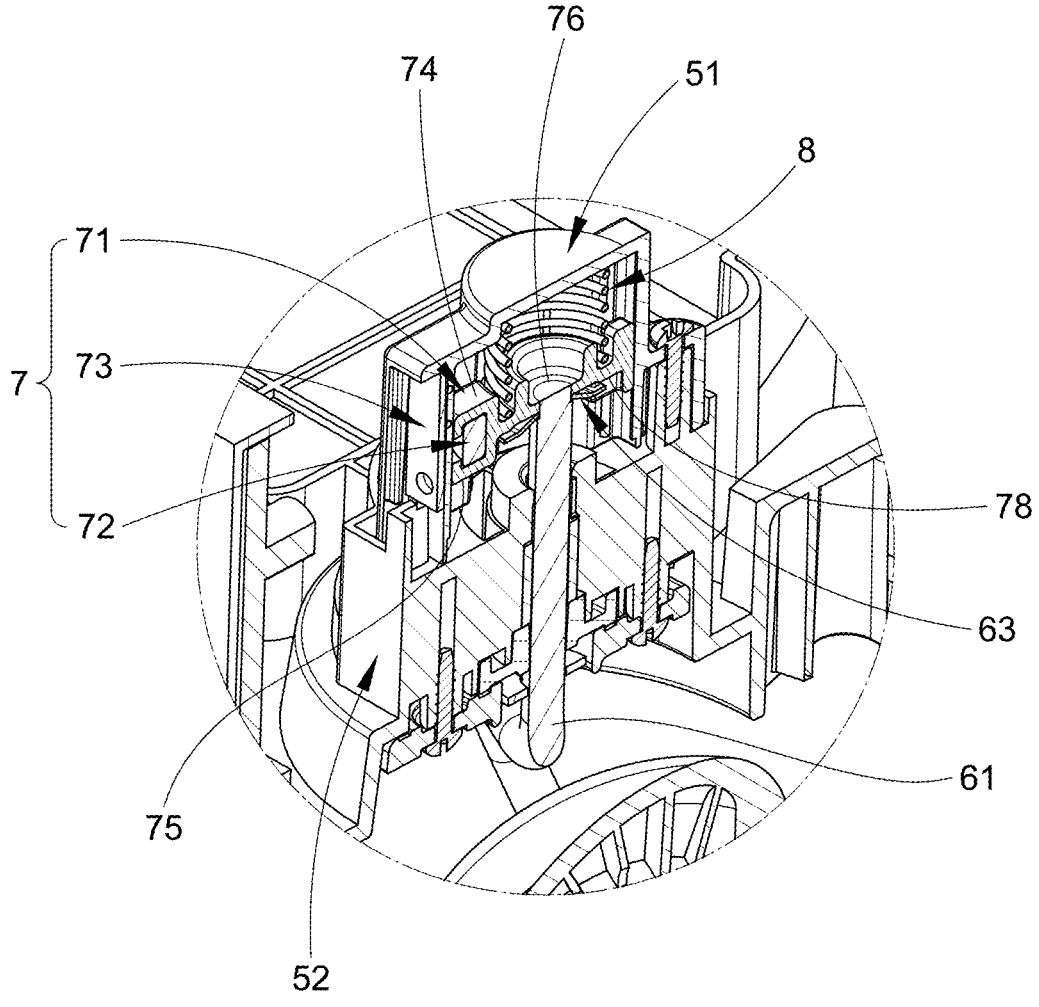
FIG. 5 is a perspective longitudinal sectional view of a portion of the lifted detection mechanism of the present invention.

As shown in FIGS. 3 and 4, the location sensing unit 7 includes a movable member 71, a transmitter 72, and a receiver 73. The movable member 71 has a top surface 74, a bottom surface 75 opposite to the top surface 74, an axle hole 76 passing through the top surface 74 and the bottom surface 75, a top recess 77 located at the top surface 74, and a bottom recess 78 located at the bottom surface 75. On one hand, the movable member 71 is sleeved on the axle 61 through the axle hole 76 and located in the accommodation chamber 53, and on the other hand, the movable member 71 receives the fixing member 63 through the bottom recess 78 and is abutted against the fixing member 63, such that the movable member 71 is moved axially together with the axle 61. In addition, two opposite sides of the movable member 71 have two convexities 79 inserted in the limiting concavities 54 of the top cover 51 (see FIG. 6). Because the configuration of the convexity 79 corresponds to the configuration of the limiting concavity 54, the movable member

71 can be guided to move axially together with the axle 61, and meanwhile, the movable member 71 can be prevented from rotating around the axle 61 together with the fixing member 63. Further, one of the transmitter 72 and the receiver 73 is disposed to the fixed seat 5, and the other of the transmitter 72 and the receiver 73 is disposed to the moveable member 71. In this embodiment, the receiver 73 is disposed to a position of the top cover 51 corresponding to the limiting concavity 54, and the transmitter 72 is disposed in a hole 791 of one convexity 79 of the movable member 71 (see FIG. 6). As such, when the fixing member 63 is moved together with the axle 61 to the topmost position P1 (see FIG. 3), the transmitter 72 and the receiver 73 correspond to each other. When the fixing member 63 is moved together with the axle 61 to the bottommost position P2 (see FIG. 4), the transmitter 72 and the receiver 73 are staggered with each other so as not to correspond to each other. To deserve to be mentioned, in this embodiment, the transmitter 72 can, but not limited to, be a magnetic, and the receiver 73 can, but not limited to, be a Hall sensor.

The elastic member 8 is a coil spring in this embodiment. As shown in FIG. 3, the elastic member 8 is located in the accommodation chamber 53 and provided with one end abutted against the top cover 51 and the other end received in the top recess 77 of the top cover 51 and abutted against the movable member 71. In this way, the elastic member 8 provides an elastic force to move the movable member 71 towards the bottommost position P2 (see FIG. 4).

In actual operation, when the mowing robot 1 is not lifted to allow the wheel 6 to touch the ground, the fixing member 63 is located at the topmost position P1 where the transmitter 72 and the receiver 73 correspond to each other (see FIG. 3). At this time, the blade unit 2 is controlled by the control system 3 to operate. When a user lifts the mowing robot 1 in order to move or repair it, the wheel 62 is raised off the ground to allow the fixing member 63 to be lowered together with the axle 61 due to the weight of the wheel 62. At this time, the movable member 71 is driven by the elastic force of the elastic member 8 to move downwards along with the fixing member 63 to the bottommost position P2 (see FIG. 4). As such, the transmitter 72 and the receiver 73 are actually staggered with each other, such that the control system 3 receives a signal generated by the receiver 73 to control the blade unit 2 to stop working, thereby preventing the user from being cut by the blade unit 2 in operation.

As indicated above, in the lift detection mechanism 4 of the present invention, the movable member 71 can be ensured to move to a position where the transmitter 72 and the receiver 73 are staggered with each other for ensuring security mechanism to work normally under all conditions, thereby achieving the purpose of enhancing safety of use.

What is claimed is:

1. A lift detection mechanism of a mowing robot, comprising:

a fixed seat having an accommodation chamber therein;

a wheel set including an axle penetrated into the fixed seat and rotated relative to the fixed seat and moved axially along an axial direction thereof, a wheel rotatably connected to the axle and located outside of the fixed seat, and a fixing member fixed to the axle and located in the accommodation chamber so as to be rotated together with the axle and moved axially together with the axle between a topmost position and a bottommost position;

a location sensing unit including a movable member, a transmitter, and a receiver, the movable member being sleeved on the axle and the wheel and located in the accommodation chamber, the movable member being moved axially together with the fixing member and the fixing member being rotatable relative to the movable member, one of the transmitter and the receiver being disposed to the fixed seat, and the other of the transmitter and the receiver being disposed to the moveable member; and an elastic member providing an elastic force to move the movable member towards the bottommost position;

wherein when the fixing member is located at the topmost position, the transmitter and the receiver correspond to each other, and when the fixing member is located at the bottommost position, the transmitter and the receiver are staggered with each other.

2. The lift detection mechanism as claimed in claim 1, wherein the fixed seat includes a top cover and a bottom cover connected to the top cover; the accommodation chamber is located between the top cover and the bottom cover; the movable member has a top surface, a bottom surface opposite to the top surface, an axle hole passing through the top surface and the bottom surface, and a top recess located at the top surface; the axle is penetrated through the axle hole; the elastic member is a coil spring and provided with one end abutted against the top cover and the other end received in the top recess and abutted against the movable member.

3. The lift detection mechanism as claimed in claim 2, wherein the movable member has a bottom recess located at the bottom surface; the fixing member is received in the bottom recess and abutted against the moveable member.

4. The lift detection mechanism as claimed in claim 2, wherein the top cover has a limiting concavity, and one side of the movable member has a convexity inserted in the limiting concavity for preventing the movable member from rotating together with the fixing member around the axial direction of the axle.

5. The lift detection mechanism as claimed in claim 4, wherein the receiver is disposed to a position of the top cover corresponding to the limiting concavity, and the transmitter is disposed to the convexity of the movable member.

\* \* \* \* \*